May 17, 1955     H. D. STECHER     2,708,299
CABLE CLAMP
Filed Dec. 22, 1951     2 Sheets-Sheet 1
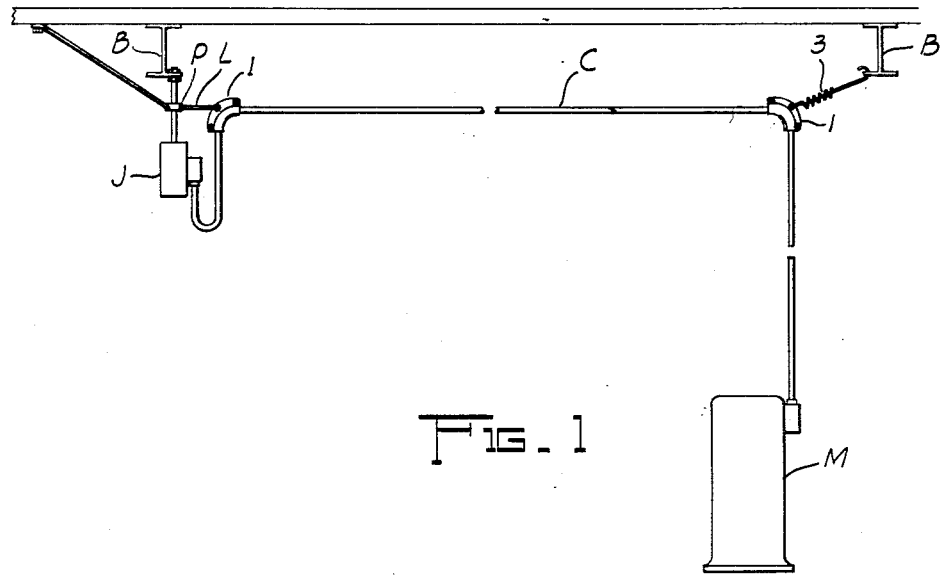
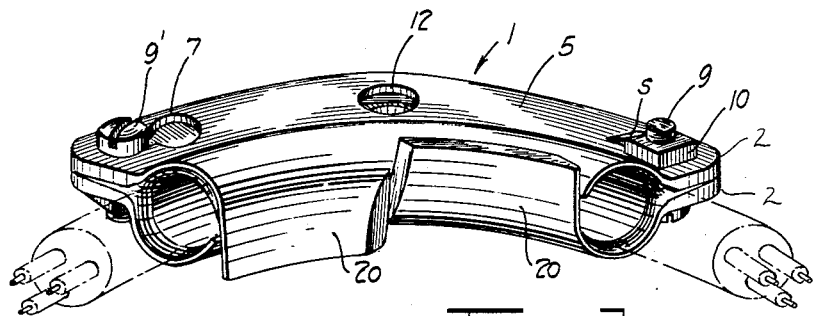
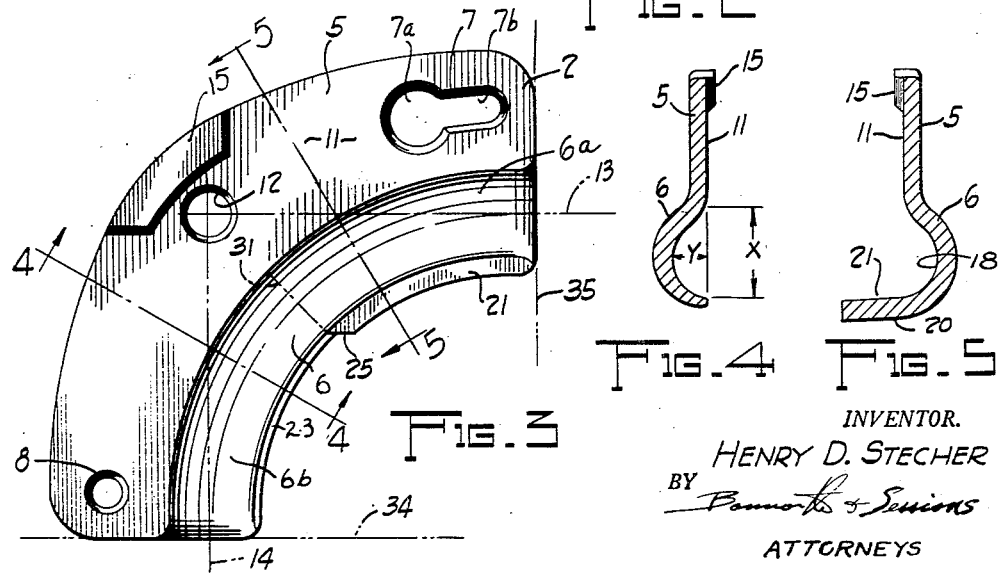
INVENTOR.
HENRY D. STECHER
BY
ATTORNEYS

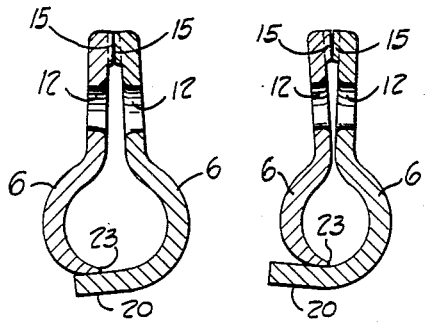
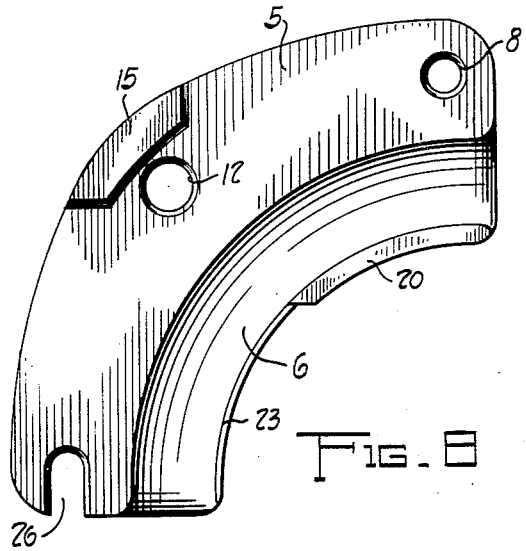
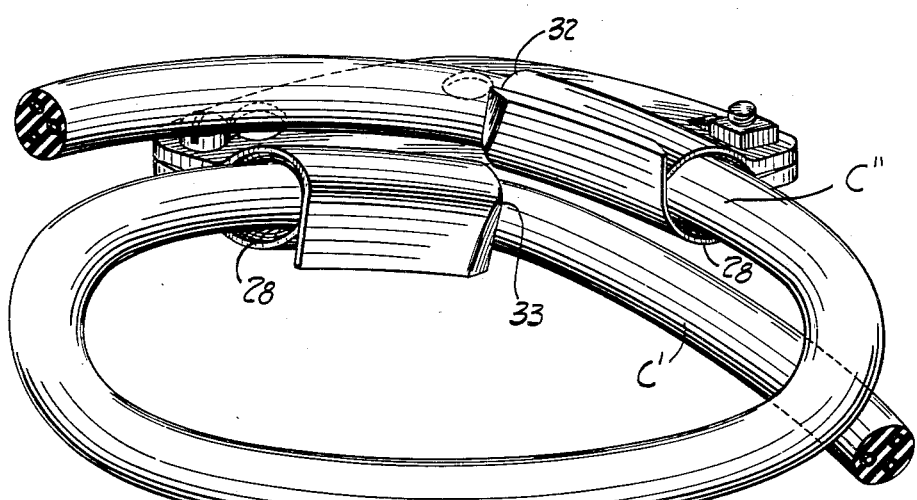
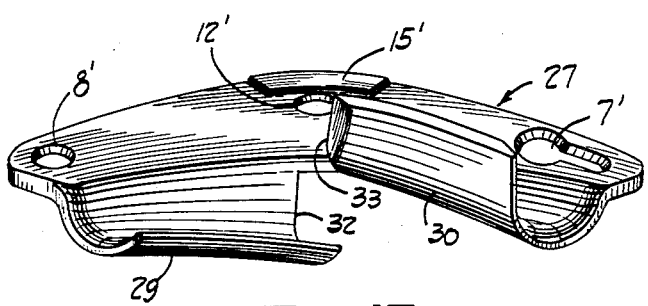

United States Patent Office 2,708,299
Patented May 17, 1955

2,708,299

CABLE CLAMP

Henry D. Stecher, Lakewood, Ohio

Application December 22, 1951, Serial No. 262,980

4 Claims. (Cl. 24—125)

This invention relates to cable fittings and more particularly to a clamp by means of which flexible electric cable, hoses, flexible tubing or the like may be suspended and/or supported.

Modern factories equipped with individually electric powered machine tools and the like often use overhead cables to transmit power to each machine. The cables may extend from a central junction box adjacent the ceiling of the factory to a point above the machine tool to which it is to be connected and then drop down to connect with the motor which drives the particular machine. It is good practice and desirable that such cable be supported at or near the place where it bends downwardly and in such a manner that the bend will be gradual and of sufficient radius to avert injury to the cable. With a single tension member acting on such corner support both the horizontal and vertical runs of the particular cable being supported readily may be subjected to a sufficient longitudinal pull or tension to prevent unsightly drooping of the cable and to maintain same in vertical alignment with the machine it feeds out of the path of moving objects such as trucks, overhead hoists and the like. The present invention embraces an improved construction of this type of supporting clamp.

An object of the present invention is to provide a cable clamp that affords continuous support for the cable throughout the length of the clamp. Another object is to provide a clamp that is adjustable to accommodate a variety of sizes of cable without sacrificing the continuous support of the cable. Another object is to provide a cable clamp comprising relatively few parts to facilitate convenient and quick assembly of the clamp on the cable so that a minimum of effort and time is required of the electrician who may be called on to install such clamps at precarious heights. Another object of my invention is to provide a cable clamp that consists of identical component parts thus affording substantial economies in the fabrication of the clamp as well as in handling, shipping and storing of the parts.

A still further object of my invention is to provide a cable clamp that may be used with equal facility as a corner supporting means and as an end anchor for cables and the like. Another object of my invention is to provide a multi-piece clamp which may be quickly applied to and removed from or adjusted on cable without necessitating attaching or removing the securing means which serve to hold the pieces together. Another object of my invention is to provide a clamp which applies clamping pressure throughout the length of the clamp and thus provides a strong non-slip cable grip having a relatively large clamping area and desirably low unit pressure.

These and other objects of my invention will become apparent from the following description of preferred forms thereof reference being had to the accompanying drawings in which Figure 1 is a partially schematic representation of a cable system employing my cable clamp; Figure 2 is a perspective view of the underside of my improved clamp in clamping position on a length of cable shown in dot-dash lines; Figure 3 is a side elevation as viewed looking toward the inside of one of the two halves of the clamp; Figure 4 is a transverse section taken on the line 4—4 of Figure 3; Figure 5 is another transverse section taken on the line 5—5 of Figure 3; Figures 6 and 7 are transverse sections through the central part of the complete clamp, the cable being omitted for purposes of clarity, and showing the position of the side parts of the clamp at maximum and minimum limits of lateral adjustment; Figure 8 is a side elevation of the side piece of a modified form of cable clamp; Figure 9 is a perspective view looking from the underside of another modified form of cable clamp adapted to embrace and support two legs of a looped cable; and Figure 10 is a perspective view of one-half of the clamp of Figure 9.

In Figure 1 there is shown schematically an overhead cable system for supplying electric power to a machine M wherein the cable C is supported directly above the machine on some portion of the building structure such as the ceiling I-beam B. In such systems the cable generally is connected to a central junction box J located near the ceiling of building and from the junction box extends along the ceiling to the point of support over the machine where it drops down to the point of connection to the machine. The present invention is directed to the improved clamp 1 which is adapted to grip and hold the cable directly and which in turn may be suspended from the building. This clamp is constructed in such a manner that it may be used with equal facility and advantage as a supporting clamp for the corner portion of cable as shown at the right in Figure 1 or as an end anchor clamp at or near the junction box as shown at the left in Figure 1. These features will be treated fully in the description which follows.

One of the preferred embodiments of my invention is shown in Figures 2 to 7 inclusive and comprises essentially a clamp 1 having two identical side parts or pieces 2, 2 which are arranged to fit together and around the cable C to be supported. Since I prefer to make these two pieces identical in size, shape and contour, in the description which follows like reference characters will indicate like parts on either piece. Each piece preferably is formed with a transversely arcuate groove which extends longitudinally of the piece preferably around an arc or curve of substantially 90° so that when the parts are fitted together so as to form a completely assembled clamp, these concave arcuate grooves will face each other and define a continuous longitudinally curving channel extending the entire length of the fitting in which the flexible cable C is adapted to be disposed and supported. The clamp therefore in its preferred form constrains the cable disposed therein to bend around a substantially 90° corner on a radius that is sufficiently large to permit bending of the cable without causing injury thereto and also engages or grips a sufficiently long length of the cable so that unit gripping pressure will be small so not to squeeze or compress the cable deleteriously and yet obtain a total gripping force which will be large enough to assure a firm tight non-slip hold of the clamp on the cable.

When the clamp has been assembled around and adjusted on the particular cable to be supported, a support member 3, preferably a spring as shown, or the like, is connected to the outside corner of the clamp and in turn is secured at its other end to a suitable support such as the beam B on the ceiling of the factory. Preferably the direction of pull of this support member 3 will be at about a 30° angle with the axis of the horizontal run of the cable so that a modest pull or tension will be exerted on the cable both in a horizontal and vertical direction. This insures that there will be no dropping of the horizontal run of the cable and that the vertical reach thereof will be truly vertical with respect to the machine to which it is connected.

The side pieces 2, 2 of my clamp preferably are formed as metal stampings or castings, or they may be molded from plastics or insulating material, each piece being shaped with a backing portion 5 and two longitudinally curved C-shaped cable gripping portions 6a and 6b which in this embodiment of my invention have a common axis and merge together to form a substantially continuous groove 6. In order to secure the pieces together around a cable, the backing portion of each piece preferably is provided with a keyhole-shaped slot 7 located at one end and a hole 8 at the other end adapted to receive a suitable screw 9 which is engaged by a clamping nut 10. As an alternate construction, the hole 8 may be tapped and screw 9 threaded directly into it, which would eliminate the need of clamping nut 10. The screw 9 is assembled in the hole 8 with the head 9' of the screw facing the inside surface 11 of the backing portion 5. Thus when the two side pieces are assembled the head 9' of each screw passes through the enlarged part 7a of slot 7 in the mating side piece and thereafter the shank of each screw is slipped into the narrow part 7b of the slot by relative longitudinal movement of the pieces, the heads of the screws locking the pieces together against sidewise separation. The keyhole-shaped slot is formed with the enlarged opening 7a at the inboard end thereof and with the narrow portion 7b extending toward the end of the piece so that the two side pieces are initially assembled with flanges 21 on each piece will be separated from each other as will appear in the description which follows. Thus the keyhole-shaped slots 7 in conjunction with screws 9 and clamp nuts 10 permit quick connection and disconnection of the parts and allow the pieces to be loosely locked against transverse separating movements to facilitate adjustment of the clamp longitudinally on the cable to the desired clamping position. When the screws are tightened the side pieces 2, 2 are drawn together and a uniform gripping pressure is applied to the entire length of the cable disposed within the clamp. A stop S may be formed on the backing portion of each piece adjacent aperture 8 to prevent nut 10 from turning during the tightening operation.

The backing portion 5 of the side piece preferably has a central aperture 12 through which the support member 3 is hooked for suspending the clamp and cable from the overhead supporting beam. The aperture 12 preferably is formed at the point on the backing portion where the perpendicular tangents to the longitudinal curved axis of the groove 6 intersects on the flat portion of the clamp; that is, the center of aperture 12 is located at the intersection of tangent 13, see Figure 3, with tangent 14. Thus, when the clamp is suspended or supported by a hook of the spring 3 inserted in the apertures 12, the clamp will orient itself with respect to the cable supported thereby and the spring so that extensions of the center lines of the horizontal and vertical reaches of the cable will intersect at the point of support. When this condition prevails equal and balanced tension forces or, depending on the angle of suspension, any relative proportion of tension forces will be exerted by the supporting spring 3 and clamp on both legs of the supported cable insuring that slack will be taken up in the cable in both directions and also insuring that the cable will enter and leave the clamp on a straight line and will not be twisted or kinked.

Another important and unique advantage of this location of the aperture 12 on the backing portion is that such construction permits the clamp to be used quite effectively as an anchor member to secure cable and the like to a tension load supporting member at a point, for example, where the cable is connected to a junction box. This is illustrated in the upper left hand corner of Figure 1 where cable C is shown connected into junction box J, with the clamp embracing the cable sufficiently in advance of the junction box to leave a loose load free loop of cable at the box. The facility with which my clamp acts as an anchor member is enhanced by the construction which results in alignment of the axis of the cable being supported that is, the horizontal leg as shown in Figure 1, with connection aperture 12 and the support point P on the fixed member. Thus, the full force of any longitudinal pull on the horizontal portion of the cable will be resisted by the fixed support member through the link L without deleterious twisting or turning of the clamp and at the same time the electrical connections of the cable in the junction box will be unaffected and protected.

In order to facilitate lateral or sidewise adjustment of the mating side pieces of my clamp so that a single clamp may be readily adjusted to a variety of sizes of cable, I provide a pad or raised portion 15 on the backing portion 5 of each piece between the hook receiving aperture 12 and the outer edge of the piece. This provides for a rocking action between the pieces as illustrated in Figures 6 and 7. When the two side pieces are fitted together to form the composite clamp, the backing portions engage each other on their respective pads 15 which then function as a mutual fulcrum about which the lower cable gripping parts of the pieces may pivot and/or rock toward and away from each other. The clamping force applied by the screws 9 and nuts 10 in the assembled clamp is offset from this fulcrum so that when the nuts are tightened down on screws 9 the grooved cable gripping portions 6a and 6b of the pieces will swing or pivot together about the pads 15 causing the channel to be constricted and the cable to be gripped tightly. Also, the line connecting the centers of the clamping screws lies between the pivot point or fulcrum 14 of the clamp and the major part of the mass of cable engaged by the clamp so that the cable embracing parts of the pieces will move together rapidly when the screws 9 are tightened by reason of location of the clamping force between the fulcrum and the cable mass being clamped.

The grooved portions 6a and 6b of the side piece, as illustrated and described herein, are designed to support and clamp around a single length of generally cylindrical cable and thus have a C-shaped continuous inner concave surface 18 which merges smoothly and uniformly with the inner surface 11 of the backing portion of the piece. The outer ends of the grooved portions are rounded or flared outwardly to prevent snagging, cutting or other injury to the flexible cable as it enters and leaves the clamp. It will be understood that the groove 6 may have many different shapes in order to accommodate correspondingly different shapes of cable or wire and accordingly the C-shaped groove is illustrated and described herein merely by way of example. In order to provide continuous support for the cable throughout the range of lateral or sidewise adjustment of the side pieces 2, 2 relative to each other, there is provided a flange 20 on each piece which extends substantially transversely of the plane of the backing portion 5 of the piece and projects from the bottom of portion 6a of the groove 6, see Figure 5, and preferably is integral with the main body of the side piece. This flange preferably is curved in the direction of the length of the piece to conform to the longitudinal curve or bend of the groove 6, is disposed on side of the groove nearest the radius of longitudinal curvature thereof and is approximately one-half the length of the groove. The inner surface 21 of the flange merges smoothly and uniformly with the concave surface of groove 6 and in conjunction with the corresponding flange of the mating side piece constitutes a part of a continuous cable supporting surface or bottom wall for the clamp.

The free edge or lip 23 of the other half of the side piece adjacent groove 6 preferably lies substantially in the plane of the backing portion and is adapted to rest on the inner surface 21 of the mating side piece when the clamp is assembled, that is, the flange of one piece overlaps the lip of the mating piece. In order to reduce or eliminate the ridge effect the longitudinal edge of lip 23 as the lip rests on top of flange 20 of the other side piece, I prefer to make the lip relatively thin with the outer surface or underside thereof curving into the inner surface 18 on an arc of smaller radius than that of the radius of curvature of groove 6. With this construction, the inside surfaces of the assembled side pieces merge together evenly at their junction thoughout the range of transverse adjustment and present a relatively smooth substantially continuous surface on which the outer parts of the cable bear when supported in the clamp. I also prefer to bevel the inner transversely extending edge 25 of each flange 20 to eliminate sharp corners on the exterior of the clamp and thereby facilitate safe handling and assembly of same.

The assembly of the clamp around a cable to be supported is simple, convenient and may be accomplished with speed and facility in the following manner. Firstly, and preferably, screws 9 are inserted in holes 8 of the pieces with the enlarged screw heads projecting from the inside surface of each piece and nuts 10 threaded thereon, there being a sufficient length of the shank of each screw left free to permit the heads of the screws to project through the keyhole-shaped slot 7 of the adjacent or mating piece. The mating side pieces then are fitted together with the grooved portions 6 of each piece embracing the section of cable to be supported, the screws 9 being lined up with the enlarged part 7a of the slot 7 so that the screws and heads thereof will project through these slots and the flange 20 of each piece will overlap the lip 23 of the opposite piece. The pieces are then moved longitudinally together with the shank of each screw slipping into the narrow portion 7b of the slots until the inner edge 25 of each flange abuts the other. This loosely locks each piece together in a transverse direction.

When the two pieces are thus fully fitted together, the aperture 12 in the backing portions will be transversely aligned with each other and ready to receive the hook of supporting spring 3. The insertion of this supporting hook through aligned apertures 12 effectively locks the two pieces against relative longitudinal separating movement and yet permits limited movement of the pieces transversely of each other. This makes it possible to adjust, if desired, the position of the clamp longitudinally of the cable without disconnecting the clamp from the overhead support, which features of my invention greatly facilitates the installation of overhead cables.

The width of the cable receiving channel in the clamp defined by the grooves in each side piece may then be adjusted to accommodate the particular size of cable disposed therein, this adjustment being facilitated by the rocking or pivoting of the two pieces about their respective pads 15. When this occurs, the lip 23 on each piece will advance inwardly on the inner surface 21 of the opposite flange 20 until the sides of the walls of grooves 6 uniformly engage a substantial portion of the periphery of the cable and gently squeeze and grip same throughout the entire length of the clamp. The movement of the pieces together is caused by tightening screws 9 in nuts 10. In event a re-adjustment of the position of the clamp on the cable is desired after the clamp has been tightened, screws 9 and nuts 10 are loosened, the side parts of the clamp moved or rocked away from each other sufficiently to loosen their grip on the cable, and the cable slipped longitudinally through the clamp until the adjustment is effected. Thereafter the screws and nuts are again tightened to re-establish the grip on the cable.

The construction of my improved clamp permits the accommodation of a variety of sizes of cable. By way of example, a nominal ½" size clamp preferably has a groove in each piece with a height X, see Figure 7, of approximately ⅝", a depth Y of approximately ¼", and a flange which extends beyond the plane of the surface 11 approximately ½". I have found that this size of clamp is capable of satisfactorily supporting and gripping cables ranging in diameter from 7/16" to ¾". Figures 6 and 7 illustrate the relative positions of the parts at the limits of adjustment of the width of the channel.

In Figure 8 there is illustrated an alternate form of clamp construction which is substantially the same as the clamp described above except that in place of the keyhole-shaped slot 7 spaced near but inwardly from the same end of each piece from which the flange 21 extends, there is provided a narrow slot 30 of uniform width which is open at its outer end and which is formed at the end of the clamp remote from the flanged end thereof, aperture 8 being formed near the end opposite from the open slot 30. With this construction, the shank of each screw 9 may be slipped directly into the slot 26 by longitudinal shifting of the pieces relative to each other without the necessity of these screws being initially aligned with and then inserted into the slot by transverse movement of the pieces. This somewhat simplifies the assembly of the clamp and also results in desirable savings in the cost of fabricating the clamp. Otherwise, the modified version is identical in its function as a clamp with the one described above.

In Figures 9 and 10 is illustrated another modified form of my invention wherein the clamp is arranged to grip and support two reaches or lengths of cable as, for example, when same is looped as shown in Figure 9 to provide a sufficient amount of reserve cable to allow for substantial changes in floor location of the machine to which the cable is connected.

This clamp is based on the same principle of gripping and supporting the cable as is embodied in the clamp described above and comprises two identical half pieces 27, 27 formed to fit together so as to define a pair of transversely offset channels or passages 28, 28 in which two separate legs C' and C" of the cable are adapted to be disposed. To attain this dual support function, each piece preferably has substantially one-half 29 of its lower grooved portion offset from the other half 30 so that inner surfaces of the grooved parts are not continuous. For purposes of explanation, it is as though the part shown in Figure 3 were cut along the dot-dash line 31 terminating at the inner longitudinal edge of the groove, and thereafter the adjacent edges 32, 33 of the severed portions moved apart or offset from each other by limited rotation of each severed portion in opposite directions about respective axes 34 and 35, see Figure 3, that extend radially from the center of longitudinal curvature of the clamp through the opposite ends of the clamp. As shown in Figure 10, the axes of the grooves in the portions 29 and 30 of each piece are askew to the plane of the backing portion 5' thereof while these same axes preferably are substantially parallel to each other. Actually, I prefer to form each side piece 27 by casting or by pressing same in suitable dies. The amount of lateral offset of the two grooved portions 27, 27 of each piece at their adjacent inner edges 32, 33 preferably is substantially the same as the outside diameter of the largest cable which the particular clamp is designed to accommodate. This insures that the inner end of each separate cable channel 28 in the assembled clamp will be unobstructed, thereby permitting each leg of the cable to extend continuously through the respective clamp channel.

In other respects the double cable support clamp shown in Figures 9 and 10 has essentially the same features of construction, operates in substantially the same manner as the clamp described above in connection with Figures 1–8, and has the several advantages of economy of manufacture and facility of installation discussed above. Both pieces rock or pivot relative to each other about pads 15' to effect lateral adjustment of the clamp and a central aperture 12' is formed in each piece to permit suspension of the clamp from an overhead support. The pieces 27, 27 likewise are assembled and clamped together in substantially the same manner as described above.

It will be apparent from the above description of preferred forms of my invention that by providing a clamp that is adjustable in directions transversely of the longitudinal axis of cable supported thereby, provision is made for an elongation of the diameter of the cable normal to the radius of bend of cable.

In other words my improved clamp is fully capable of accommodating the widening of the cable as it bends around substantially a 90° corner because the direction of adjustment of the clamp corresponds to the direction of widening of the cable. Thus my clamp permits the cable disposed therein to assume its natural cross-sectional shape as it bends around the corner, avoids deleterious straining of the cable structure and generally permits long life of the cable.

Modification and changes may be made to the herein described and illustrated forms of my cable clamp without departing from precepts of my invention. It will be understood therefore that the above description of preferred embodiments of my invention is not to be taken as a limitation on the scope of the invention, which scope rather is defined in the appended claims.

I claim:

1. A clamp for cable and the like comprising a pair of identical side pieces adapted to fit together around two juxtaposed lengths of cable, each side piece having a backing portion disposed in a plane and a pair of arcuately shaped cable embracing portions depending from said backing portion, each cable embracing portion being curved in the direction of its length and each having an axis extending skew to the plane of the backing portion, said arcuately shaped portions of each said piece having their adjacent inner edges laterally offset from each other whereby when said pieces are fitted together they define two channels offset at their adjacent ends, and means to detachably secure said side pieces together.

2. A cable clamp comprising two identical side pieces each having cable embracing parts having a flanged portion with inner surface and a lip portion, said pieces when clamped around a cable having the flanged portion of one piece overlying the lipped portion of the other with the lip portion resting on said inner surface of said overlapping flange portion to form a bottom wall to support said cable, said cable embracing parts comprising concavely grooved portions having laterally offset longitudinal axes and defining when said pieces are assembled together two laterally offset channels of equal length for receiving and supporting two juxtaposed lengths of cable, and means to fasten said pieces together.

3. A cable clamp comprising a pair of side pieces adapted to fit together around cable or the like, each piece having longitudinally extending grooved portions curved in the direction of the length of the clamp and adapted to embrace said cable and a backing portion integral with said grooved portions, said grooved portions having concave inner surfaces which terminate for part of their length at one longitudinal edge of the clamp and define therewith a lip and for the balance of their length in a transversely extending flange, said pieces being adapted to fit together with the concave surfaces on each piece in opposed positions and with the flange of one piece overlying the lip of the opposite piece for supporting the cable, said backing portion having a keyhole-shaped aperture at one end and a screw receiving hole at the other, screw means carried in said hole, said aperture having an enlarged portion to receive the head of said screw means carried by the opposite side piece and a narrow portion extending from enlarged portion in the direction toward the flanged end of the clamp to receive the shank of screw means of the opposite side piece.

4. A cable clamp comprising a pair of side pieces adapted to fit together around cable or the like, each piece having longitudinally extending grooved portions curved in the direction of the length of the clamp and adapted to embrace said cable and a backing portion integral with said grooved portions, said grooved portions having concave inner surfaces which terminate for part of their length at one longitudinal edge of the clamp and define therewith a lip and for the balance of their length in a transversely extending flange, said pieces being adapted to fit together with the concave surfaces on each piece in opposed positions and with the flange of one piece overlying the lip of the opposite piece for supporting the cable, said backing portion having a screw receiving hole at the end of said clamp from which said flange extends, screw means carried in said hole, and an open-ended slot in said backing portion at the other end of the clamp to receive the shank of said screw means in the opposite side piece when said pieces are fitted together.

References Cited in the file of this patent

UNITED STATES PATENTS

| | | |
|---|---|---|
| 290,455 | Miller | Dec. 18, 1883 |
| 706,227 | Fletcher | Aug. 5, 1902 |
| 895,397 | Brazelle | Aug. 4, 1908 |
| 1,146,489 | Folkerts | July 13, 1915 |
| 1,767,432 | Caulkins | June 24, 1930 |
| 1,790,694 | Becker | Feb. 3, 1931 |
| 1,884,036 | Malone | Oct. 25, 1932 |
| 2,021,515 | Matteo | Nov. 19, 1935 |
| 2,449,593 | Drake | Sept. 21, 1948 |

FOREIGN PATENTS

| | | |
|---|---|---|
| 588,309 | Great Britain | May 20, 1947 |
| 728,965 | Germany | Dec. 7, 1942 |